May 24, 1966 W. R. McCONNELL ETAL 3,253,246
PRINTED CIRCUIT CARD CONNECTOR
Filed July 30, 1963 3 Sheets-Sheet 1

INVENTOR
WILLIAM R. McCONNELL
PETER R. SCHULZ
BY Donald R. Campbell
ATTORNEY

May 24, 1966 W. R. McCONNELL ETAL 3,253,246

PRINTED CIRCUIT CARD CONNECTOR

Filed July 30, 1963 3 Sheets-Sheet 3

United States Patent Office 3,253,246
Patented May 24, 1966

3,253,246
PRINTED CIRCUIT CARD CONNECTOR
William R. McConnell, Johnson City, and Peter R. Schulz, Endwell, N.Y., assignors to International Business Machines Corporation, New York, N.Y., a corporation of New York
Filed July 30, 1963, Ser. No. 298,695
7 Claims. (Cl. 339—17)

This invention relates to printed circuit card connectors, and more particularly to spring connectors for mounting printed circuit cards at right angles to one another.

An object of the invention is to provide a generally improved and more satisfactory spring connector for removably mounting one or more printed circuit cards approximately perpendicular to another printed circuit card.

Another object is the provision of a new and improved electrical connector adapted for use in an arrangement in which a plurality of small printed circuit cards or the like are mounted at right angles to a single large printed circuit card, the large card bearing conductors for interconnecting the various small cards and for supplying power and ground potential thereto.

Yet another object of the invention is to provide an electrical connector of the foregoing type wherein the socket is on the small cards so that the large card is relatively simple and can be conveniently and inexpensively exchanged.

A further object is the provision of an improved connector for plugging one printed circuit card onto another card having the advantages of economy, ease of manufacture, universality, and adaptability to engineering change procedure.

The foregoing and other objects, features and advantages of the invention will be apparent from the following more particular description of preferred embodiments of the invention, as illustrated in the accompanying drawings wherein.

Figures 1, 2:
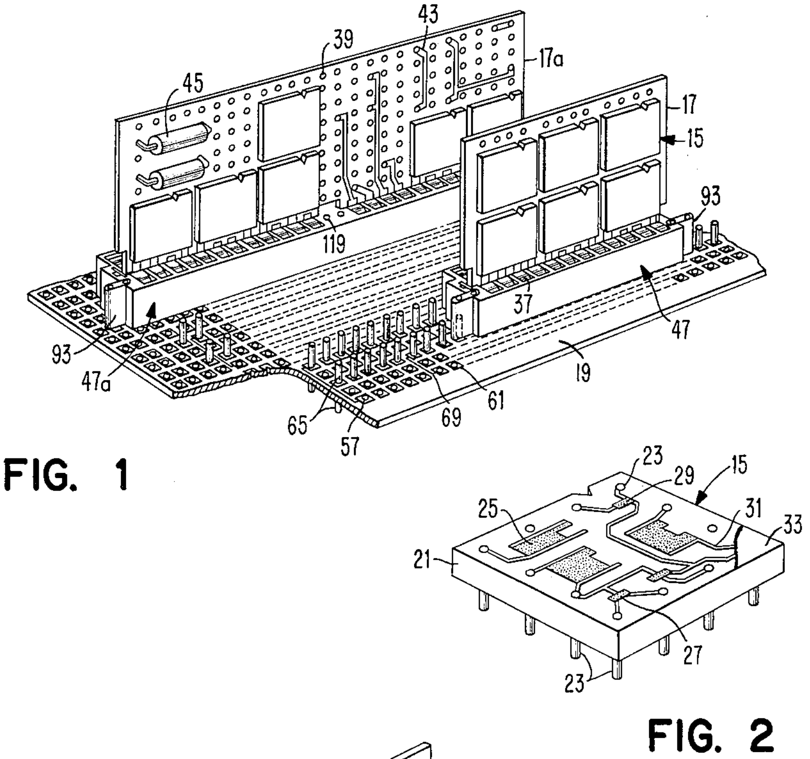
FIG. 1 is a perspective view of small printed circuit cards removably mounted on a large card utilizing electrical connectors according to the invention, the large card being shown broken away.
FIG. 2 is a perspective view of a circuit module shown in FIG. 1 before insertion onto a small card, drawn to an enlarged scale.

The high-density electronic package shown in FIG. 1 comprises essentially a plurality of miniaturized solid state cicuit modules 15 attached to a small printed circuit card 17 which is in turn pluggably mounted approximately at right angles to a large card 19. Each of the circuit modules 15 (see FIG. 2) has an insulating substrate 21 which is preferably square and is made of a suitable ceramic material such as aluminum oxide. Terminal and connector pins 23 are fastened to the substrate 21 in rows adjacent each of its edges and project from its bottom surface forming a square pattern of pins of about the same length. On the top of the substrate 21, connecting with the terminal pins 23, are various passive and active electronic components which are interconnected by printed circuit lines. Typically, a module circuit comprises painted-on resistors 25, and chip diodes 27 and transistors 29 interconnected with one another and the terminal pins 23 by painted-on printed circuit lines 31. The miniaturized circuits on the modules 15 are preferably solid-state logic circuits suitable for use in computers and data-processing and business machines of various types, but the type of circuit contained on the modules 15 is immaterial as to this invention. An opaque protective coating 33 of varnish or the like is normally applied to the circuitry on the modules.

The small card 17 is made from double-sided copper-clad epoxy glass or epoxy paper printed circuit board material. Although not here illustrated, some of the small cards may have inner planes. One edge of the card 17 has a plurality of terminal areas or contact tabs 35 to which are soldered, on either side of the card, a plurality of U-shaped springs 37 forming a part of the printed circuit card connector according to the invention. The remainder of the surface of the card 17 has a rectangular grid pattern of plated-thru holes 39 each end of which connects with an annular land area 41 on either side of the card. A "land" is commonly defined as "the conductive area to which components or separate circuits are attached, usually surrounding a hole through the conductive pattern and the base material." Etched printed circuit lines 43 on either side of the card connect the plated-thru holes with each other or with the contact tabs 35. The terminal pins 23 of the modules 15 are inserted through a group of plated-thru holes 39 and dip-soldered. The small card 17 can be called a 6-pack card because it is of a size to accept six modules 15 as illustrated in FIG. 1. It is obvious that the required signal, ground, and supply voltages can be supplied into the miniaturized circuits on the modules 15 through the connector springs 37, and that the modules may be interconnected with one another or to the contact tabs through the printed circuit lines 43. As to dimensions, the modules 15 are, for instance, slightly less than about ½" square, and the terminal pins 23 are spaced .125" from one another. Accordingly, the plated-thru holes 39 are on a .125" grid, and the small card 17 including the terminal tab area is just less than 1½" high and 1¾" wide.

Since it is not economically feasible to manufacture modules for many low-volume special non-logic circuits, it may be necessary to use standard discrete components to fabricate some of the circuits. The small card **17*a* (FIG. 1) is identical to the small card 17 except that it is twice as long and contains a mixture of modules 15 and discrete components 45. The leads of the discrete components 45 are bent at right angles and inserted through the plated-thru holes 39 and clinched to the card as by swaging the leads. The small card 17*a* can be called a 12-pack card. However, it will be understood that either of the small cards 17 or 17*a* may comprise solely modules, a mixture of modules and discrete components, or solely discrete components. The larger card 17*a*** has more component-mounting area compared to the available contact count and will therefore find most use in functional logic using modules or in applications requiring discrete components.

The small card 17 is plugged into a housing 47 which forms part of the connector of the invention. The housing 47 has an electrical insulation and protective function, and serves to pre-load and mechanically position the contact springs 37 for plugging onto the male part of the connector on the large card 19. The 12-pack card 17*a* has a similar housing 47*a* which is nearly identical to the housing 47 except that it is about twice as long. For some small cards 17 and 17*a*, it is not necessary to have a contact spring 37 for each of the terminal tabs 35, since fewer connections are required and the necessary electrical connections can be made without the use of some of the terminals. The printed circuit card connector functions well when some of the spring contacts 37 are not present.

Figure 4:
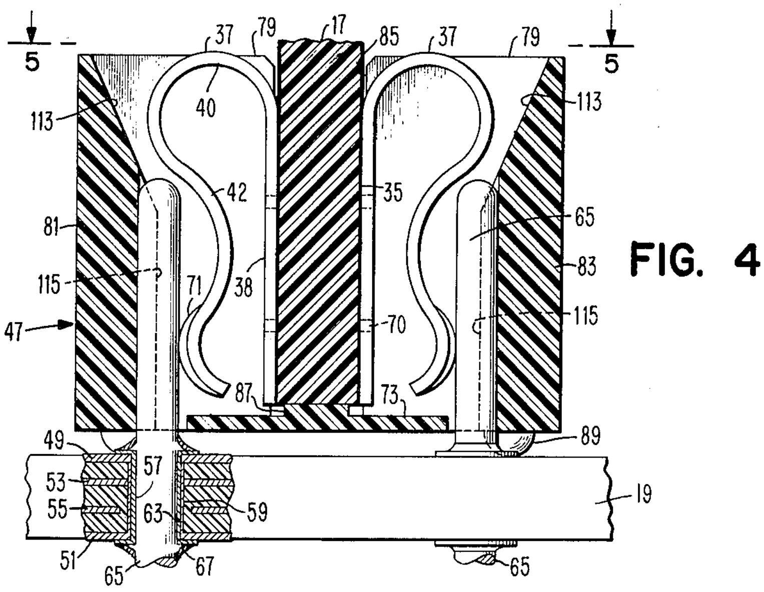
FIG. 4 is a partial cross-sectional view, to an enlarged scale, of the connector of FIG. 1 between an assembled small card and large card, wherein the outer planes in the large card are shown full and not etched into circuit patterns.
Figure 5:
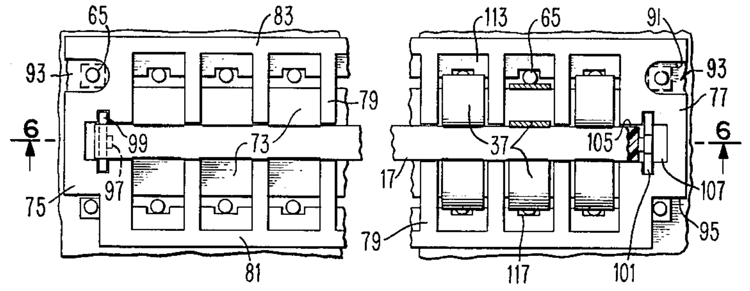
FIG. 5 is a partial cross-sectional plan view taken substantially on the line 5—5 of FIG. 4, on a reduced scale, some of the springs being shown removed or cut away.
Figure 6:
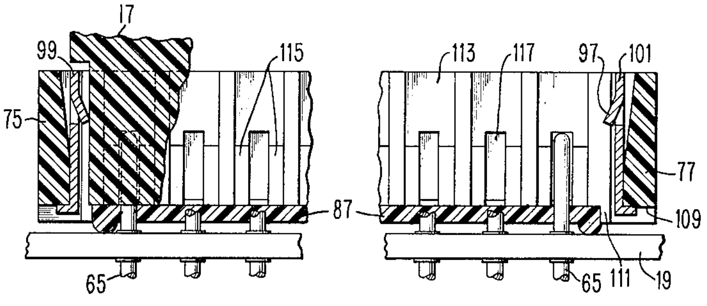
FIG. 6 is a partial cross-sectional view taken substantially on the line 6—6 of FIG. 5.
Figure 7:
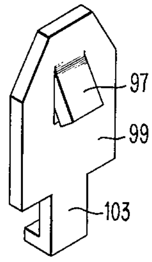
FIG. 7 is an enlarged perspective view of the card retainer shown in FIGS. 5 and 6.

Referring to FIGS. 1 and 4, the large card 19 is a four-ply epoxy glass or epoxy paper printed circuit board having two external signal planes 49 and 51 and internal voltage and ground planes 53 and 55. Other arrangements including eliminating the internal planes are possible according to the circuit requirements. Preferably the material from the which the large card is cut is a laminate of copper-foil sheets between which is disposed suitable insulating material, the layers being molded together under heat and pressure. The small cards are made from the same material and have two copper-clad surfaces and possibly one or more inner planes. Consistent with the dimensions previously given, the large card 19 is about 8" x 12" and has over most of its surface a rectangular grid pattern of plated-thru holes 57 at a .125" spacing. The plated holes 57 preferably are manufactured by drilling or punching holes in the printed circuit board material and initially plating the bores of the holes with a layer 59 of copper formed of a coating of electroless copper followed by electroplated copper until the desired thickness is built up. As is known in the art, copper can be deposited on to the surface of non-conductors or plastics by chemical reduction after having first properly sensitized and activated the surface. Conventional techniques may then be employed to electroplate copper onto this initial coating until the desired thickness is obtained. Then the bores of the holes and connecting square areas coextensive with square land areas 61 on the surfaces of the board at either end of the holes are given an overlying layer 63 of electroplated tin-lead. The result is a plated-thru hole comprised of a layer of copper and a coating of tin-lead. The plated-thru holes 39 in the small cards are manufactured in the same way.

Round pins 65 are inserted into selected ones of the plated-thru holes 57 in the large card and electrically and mechanically fastened approximately perpendicular to the card with their ends projecting from either side of the card by about like amounts. Preferably, the pins 65 are swaged to the card at either side and soldered by dropping a solder ring over the end of the pin, one side at a time, and heating in an oven or dipping into hot oil at about 390° F. for about 4½ minutes. The soldering creates fillets of solder 63 and 67 between each pin 65 and its respective plated-thru hole. One end of the pins on one side of the large card 19 is available to serve as the male portion of the subject printed circuit card connector. The other ends of the pins 65, at the other side, are preferably squared up and are available for engineering changes or field repairs or special wiring as for instance by welding or wire-wrapping discrete wires between selected pins. The pins 65 are placed into the large card 19 in pairs of rows parallel to the long side of the card with one blank row of plated-thru holes between each pair of rows, the pairs of rows being spaced from each other by two blank rows of plated-thru holes.

The plated-thru holes 57 are interconnected by printed circuit lines 69 (FIG. 1). etched out of the signal planes 49 and 51 and which extend between the square land areas 61. Desirably the lines 69 are formed by the "Printed Circuit Generator" described in the article by that name in the December, 1961, issue of the IBM Technical Disclosure Bulletin (vol. 4, No. 7), page 11. Furthermore, the lines on one side of the large card (those adjacent the voltage plane) are preferably in the X-direction while those on the other side of the card are in the Y-direction as taught by the article entitled "A Wiring Procedure" in the August 1961, issue of the IBM Technical Disclosure Bulletin (vol. 4, No. 3), page 29. It is readily apparent that negative land areas can be left in the ground and voltage planes when it is not desired to connect to the pin 65 (for transmittal to the small card) or to the associated land areas. For further description of the package in general, see the copending application of A. H. Johnson, W. R. McConnell and P. R. Schulz, Serial No. 298,603, filed July 30, 1963 and assigned to the same assignee as the present invention.

A more detailed description of the preferred embodiment of the printed circuit card connector will now be given. As was mentioned previously, the contact springs 37 (FIGS. 3 and 4) soldered to the opposite sides of the terminals 35 of the small cards 17 and 17*a* are generally U-shaped. For ease of fabrication and to obtain adequate contact forces, the contacts 37 more particularly are formed with a straight leg 38 to be soldered to the small cards and a semi-circular bight portion 40, while the other leg 42 has a sinuous shape. In its unstrained condition, the other leg 42 comprises an inwardly curved arcuate section which connects at its top with the semi-circular bight and at its bottom with an outwardly curved arcuate section. The free end of the spring curves inwardly and terminates a short distance above the bottom of the straight leg. The straight leg 38 or back portion of the spring preferably has two holes 70 to facilitate soldering to the contact tabs 35. To assure minimum contact resistance with low voltages under all conditions of use, it is desirable to have a gold-to-gold between the springs 37 and the pins 65. For this reason, the card side of the pins 65 is preferably gold plated and the outwardly curving portions of each of the springs 37 just above the inwardly turned free end is provided with a gold dot or print 71. The springs 37 preferably are made of berylium-copper and provided in strip form.

Figure 3:
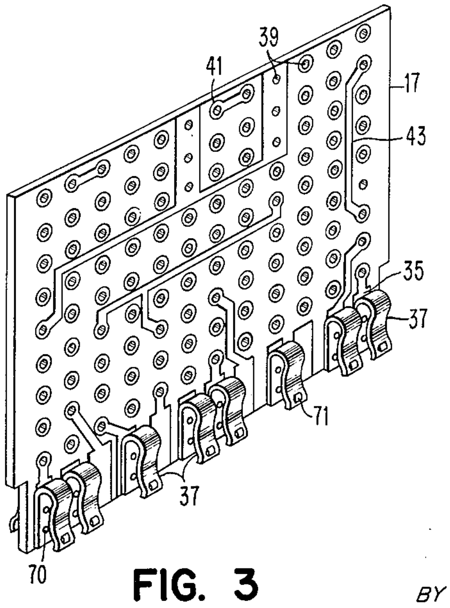
FIG. 3 is a perspective view of the reverse side of one of the small cards shown in FIG. 1 but with no circuit modules thereon and before insertion into the housing forming part of the connector.

The housing 47 is a frictionally retained type so that plugging a small card 17 with the springs 37 soldered on as shown in FIG. 3 into a housing automatically assembles the housing to the end of the card. At the same time the spring contacts 37 are pre-loaded and mechanically aligned and positioned whereby the small card with its housing can be easily plugged down onto a pair of rows of pin 65. The housing 47 (see FIGS. 4–7) is a one-piece molding made of a suitable insulating material such as plastic, for instance, phenolic. Basically, it is a four-walled elongated rectangular structure having a generally open top and a wide bottom rail 73 extending between the end walls 75 and 77. Pairs of longitudinally spaced partitions or separators 79 extend toward one another from the two side walls 81 and 83 defining a longitudinal opening 85 into which the small card may be inserted. The separators connect at the bottom with the rail 73, which also has a central rib 87 on which the small card rests to elevate it within the housing. The contact springs 37 are received within the openings formed between the separators 79 at either side.

The housing 47 has at its corners four tiny feet or bumps 89 which elevate the bottom of the housing above the surface of the large card 19 to allow space for the solder fillets 63 and 67. The two end walls 75 and 77 also have U-shaped notches 91 (FIG. 5) to receive flattened oval locators 93 (FIG. 1). The locators 93 fit down over two of the pins 65 at predetermined locations on the large card 19 and assure that all of the small cards are assembled on the large card in the same direction.

That is to say, the locators 93 have a polarizing function. The other two corners of the housing 47 are relieved at 95 to provide clearance for the interfering pins in the other row when the housing is mounted on the large card.

Upon inserting the small card 17 into the housing 47, the housing is assembled to the small card with frictional action by means of downwardly sloped struck-out projections 97 on retainers 99 and 101 supported in the two end walls of the housing. The retainers 99 and 101 are preassembled to the housing 47 before insertion of the small card 17. It is readily apparent that once the small card has been inserted into the housing, the struck-out projections or tangs 97 dig into the edges of the printed circuit card material to exert a frictional force to prevent its withdrawal unless considerable force is used as the card is wiggled back and forth. The retainers 99 and 101 are identical and basically L-shaped. Each comprises a small, flat plate from which the tang 97 is struck out and at one end of which is an L-shaped leg 103 having a bent over lug at its free end.

Each of the housing end walls 75 and 77 has a vertical recess 105 (FIG. 5) for receiving the side edge of a small card, and connecting with this recess is a T-shaped opening 107 for receiving one of the small-card retainers 99 and 101. Although T-shaped at the top, the leg of the opening 107 tapers inwardly toward the cross bars as shown best in FIG. 6. In assembling the retainer 99 or 101 in the housing, the flattened plate portion of the retainer is received in the cross bars of the T and the bent-over lug on the retainer leg 103 is in engagement with the tapering surface of the leg of the T. Upon pushing the retainer 99 or 101 into the opening, the retainer leg 103 is stressed as it slides down the tapering surface and snaps over into a groove 109 in the bottom of the housing when it reaches the end of the opening. There is a square hole 111 in the bottom of the end wall to accommodate the bent-over lug as it is being inserted and to facilitate its convenient removal by using a pointed tool to push the lug back in the groove 109 until it snaps past the end of the groove and can be pushed upwardly in the housing to remove the retainer from the top of the T-shaped opening 107.

It is obvious that the separators 79 insulate the contact springs 37 one from another after insertion into the housing. To mechanically position the springs within the housing, the side walls 81 and 83 have opposing ramps 113 which initially slope downwardly and inwardly, and at a point about half way down the height of the housing, continue on as opposing vertical surfaces 115. Upon inserting the small card with the attached contact springs 37 into the housing 47, the gold dots 71 on the outwardly curving lower ends of the springs engage the ramps 113 and slide down the opposing slopes onto the vertical walls 115, coming to rest against the vertical wall surfaces when the card is fully inserted. To receive the pins 65, the ramps 113, between each pair of adjacent separators 79, have opposing centrally located vertical notches 117 (see FIGS. 5 and 6). The notches 117 extend the full length of the vertical wall surfaces 115 and also extend upwardly into the lower ends of the opposing slope portions of the ramps 113. The notches 117 are considerably wider than the diameter of the pins 65 to accommodate bent pins but leave ramp surfaces 113 including vertical wall portions 115 adjacent each side of the separators 79. The width of the outwardly curving free end portions of the contact springs 37, in the area of the gold dots 71, is obviously greater than the width of the notches 117 so that the springs engage the ramps 113 and vertical walls 115 as the small card is being inserted pre-loading them, rather than falling into the notches 117. It will be observed that the only openings in the bottom surface of the housing 47 are the T-shaped openings between the separators 79 formed by the edge of the bottom rail 73 and the opposing edges of the vertical walls 115 and the notches 117. The transverse width of these T-shaped openings, from the bottom of the notch 117 to the edge of the bottom rail 73, is considerably greater than the diameter of the pins 65 to allow for bent pins. When plugging the assembled small card and housing down onto the large card 19, the pair of rows of pins 65 enter the notches 117 and engage the gold dots 71 of each of the contact springs, deflecting the free ends of the contact springs inwardly to stress them and provide proper contact forces. As shown in FIG. 4, the contact springs engage the insides of the two rows of pins 65.

The housing **47*a* for the 12-pack small card 17*a* comprises essentially two of the shorter housings 47 joined end to end. A slight change is that four bore holes 119 are provided at the center of the housing 47*a* to receive those pins 65 lying between the two groups of contact springs on the card 17*a*. The use of only two small card retainers 99 and 101 at the extreme ends of the housing 47*a* is required. In a similar manner, an 18-pack small card or a 24-pack small card which are, respectively, three and four times the length of the 6-pack small card 17 can be made up. For these larger sized small cards, a modulator type of housing 47 can be designed each arranged to house one group of the contact springs, or an integral housing three or four times the length of the basic housing 47** can be used.

An advantage of the printed circuit card connector according to the invention is that the contact springs 37 are pre-loaded and mechanically positioned so that the insertion forces required to plug a 12-pack or 18-pack or 24-pack card onto the large card 19 are not excessive. For a further explanation of this, reference can be made to the article "Restrained Spring Electrical Connectors" in the May 1961, issue of the IBM Techincal Disclosure Bulletin (vol. 3, No. 12), page 11. An even more important advantage of the invention is that by this design the socket is on the removable small cards and thus the large card 19 can be made relatively simple and inexpensive. The cost of the large card pins 65 and their assembly to the large card is relatively small, and furthermore the pins 65 can be programmed for insertion into selected rows of the plated-thru holes 57 or in individual positions anywhere on the card. The greater part of the cost of the connector appears in the soldered-on contact springs 37 and the housings 47 or **47*a*, but since the socket appears on the removable small unit, this means that the socket appears only when it is used. Thus, blank small card positions on any large card do not have sockets since the small card is not present. Because the large card 19 is simple and inexpensive, engineering changes by means of removing a large card and replacing it by a different large card with different printed circuit lines patterns or different pin arrangements is facilitated. Additional savings which become considerable when the volume is high are possible because the contact springs 37 need not be soldered at all terminal tab positions on the small cards when they are not needed, as is shown in FIG. 3. The connector is designed to give a minimum of 200 grams of contact force between each spring 37 and pin 65**. With gold-to-gold contact areas, this is sufficient for circuits using low voltage supplies such as +6, +3, −3 and 0 volts.

Figure 8:
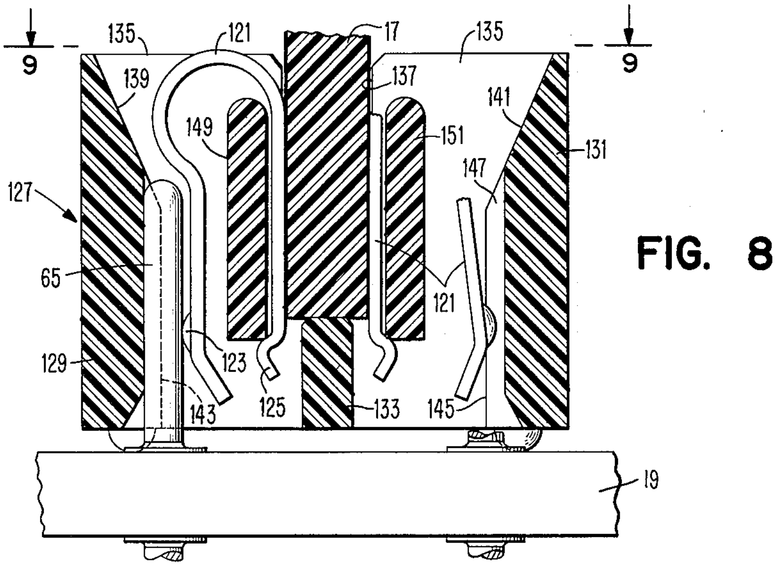
FIG. 8 is a cross-sectional view of a modified form of connector between an assembled small card and large card, parts being shown broken away.
Figure 9:
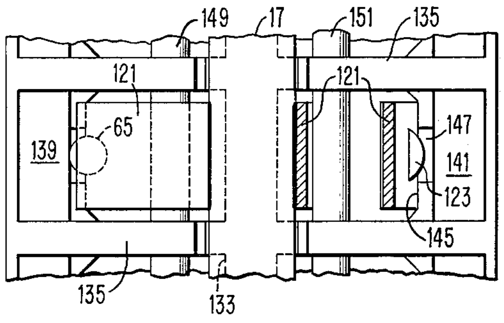
FIG. 9 is a partial cross-sectional plan view to a reduced scale taken on the line 9—9 of FIG. 8.

The modification of the invention illustrated in FIGS. 8 and 9 is similar to the preferred embodiment previously described but employs a different type device for assembling the small card to the housing. As in the previous embodiment, the contact springs 121 soldered to the terminal areas of the small card 17 are U-shaped and make contact with the inside of the large card pins 65. The springs 121 each have a straight leg adjacent the card, a semi-circular bight portion, and a contact leg which terminates in an inwardly turned end immediately above which is a gold dot 123. A specific point of difference is that the contact spring 121 has at the end of its other leg a spring catch portion 125 which projects away from the surface of the card 17. The housing 127 is similar to the housing 47 in having side walls 129 and 131 and end walls not here shown between which extend a bottom rail 133, opposing pairs of separators 135 projecting from the two side walls and being supported at the bottom by joining with the rail 133. The space between the separators 135 defines a lognitudinal opening 137 into which the small card can be inserted until engaging the bottom rail 133. As in the other embodiment, the side walls 129 and 131 have opposing ramps 139 and 141 comprising downwardly and inwardly sloping upper portions which continue on as the respective vertical walls 143 and 145. A vertical notch 147 is located centrally between adjacent separators 135 to receive the pin 65.

Just inwardly of the free edges of the separators 135 integrally joined with them, are opposing vertical rails 149 and 151 which extend downwardly to a point just below the top of the bottom rail 133. As can be seen in FIG. 8, inserting the small card 17 engages the spring catches 125 with the inner walls of the vertical rails 149 and 151 and the catches slide down these walls until springing out to catch against the bottom of the rails at about the point at which the card 17 engages the top of the bottom rail 133. It is obvious that an equivalent frictional mounting would be achieved by designing the inner legs of the springs 121 with a struck-out tang similar to the struck-out tang 97 (FIG. 7) but angled in other direction so as to permit insertion but prevent withdrawal. As the small card 17 is being inserted into the housing 127, it is seen that the gold dots 123 slide down the ramps 139 and 141 against the vertical walls 143 and 145. As was the case with the previous embodiment (FIG. 5), the free ends of the contact springs 121 are obviously made wider than the width of the notches 147 so as not to fall into the notches upon insertion into the housing. There is no change in the large card 19 and the pins 65 for this embodiment of the invention, which has all the advantages of the embodiment of FIGS. 1–7.

Figure 10:
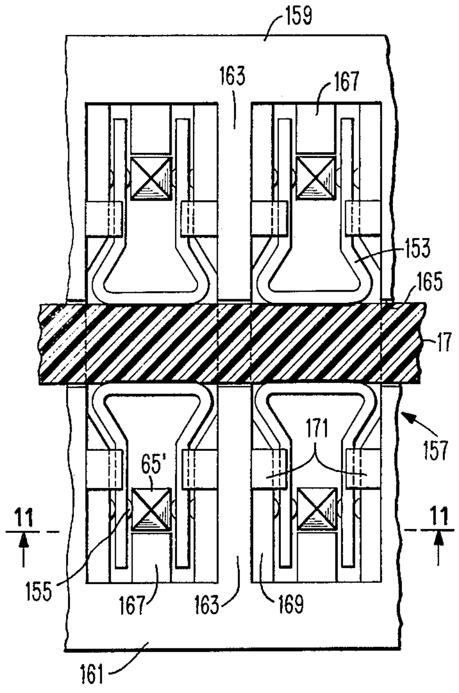
FIG. 10 is a partial cross-sectional plan view of another modification of the invention.
Figure 11:
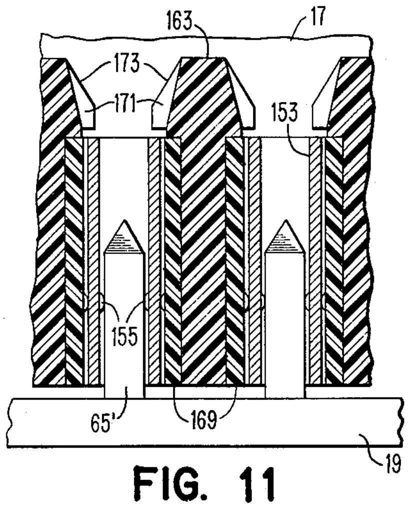
FIG. 11 is a partial cross-sectional view taken substantially on the line 11—11 of FIG. 10.

The third embodiment of the invention, shown in FIGS. 10 and 11, may be used with large card pins which are either round or which may be squared off at one end. As illustrated, the pins 65′ are squared and have pointed ends. The contact springs 153 soldered to the terminal areas of the double-sided small card 17 are generally U-shaped, but in this case the bights of the U's are soldered to the card and the two legs project sidewardly from the card. The height of the spring is somewhat greater than its length and on the opposing surfaces of the spring legs are opposing contact buttons 155. The housing 157 is a one-piece type having side walls 159 and 161 between which extend opposing pairs of separators 163 defining a longitudinal opening 165 down the center of the housing into which the small card 17 may be inserted. Centrally located between the separators 163 are opposing pairs of stop blocks 167 which project inwardly a short distance from the side walls 159 and 161. Furthermore, the separators 163 have enlargements 169 and support pairs of lugs 171. Each pair of lugs 171 has opposing downwardly sloping ramps 173 which are oriented parallel to the central opening 165 into which the small card 17 is to be inserted.

Upon inserting the small card 17 into the housing 157, it is seen that the legs of the contact springs 153 engage the ramps 173 of the lugs 171 and are pressed inwardly toward one another until snapping past the lugs. Although not here shown, the housing 157 may be held on the card from the other direction by means of engaging the notches 175 (FIG. 3) at either side of the small card. The legs of each spring 153 are restricted in both directions by the housing, that is, by the stop block 167 in one direction and the separator enlargement 169 in the other direction. This gives maximum spring load before insertion and protects the spring from overstress during insertion. Moreover, with this design contact is not lost due to bent pins.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A printed circuit card connector for pluggably mounting a first printed circuit card approximately at right angles to a second printed circuit card,
   said connector comprising a plurality of pins upstanding from a surface of said second card and which are arranged in two substantially parallel rows,
   an edge of said first card having a plurality of terminal areas on either side thereof,
   a plurality of generally U-shaped spring contacts each having two legs and a connecting bight portion,
   means for securing said contacts to at least some of the terminal areas on either side of said first card,
   an insulating housing having an opening for receiving the edge of said first card and attached contacts,
   said housing having means at either side of said opening for automatically pre-loading and aligning said contacts as said first card is being inserted into said housing, and
   means for exerting a frictional force for retaining said housing on said small card,
   the assembled housing and small card being plugged onto the rows of pins on said second card with said pins extending into said housing and deflecting said spring contacts.

2. A printed circuit card connector for pluggably mounting a small printed circuit card approximately at right angles to a large printed circuit card, said connector comprising
   a plurality of pins upstanding from a surface of said large card and which are arranged in two substantially parallel rows,
   said small card being double-sided and having a plurality of terminal areas on either side thereof at one edge,
   two opposing rows of generally U-shaped spring contacts each having two leg portions and a connecting bight portion,
   means for securing one of the portions of each of said contacts to selected ones of said terminal areas on either side of said small card,
   an insulating housing including two rows of separators spaced to define an opening for receiving said small card and attached contacts,
   said housing having means for automatically pre-loading at least one of the legs of each of said contacts and for mechanically aligning said contacts between said separators during insertion of said small card and attached contacts into said housing, and
   means for exerting a frictional force for retaining said small card on said housing,
   the assembled housing and small card being plugged onto the rows of pins on said second card with said pins extending into said housing and deflecting the one leg of each of said contacts.

3. A printed circuit connector for pluggably mounting a first printed circuit card approximately at right angles to a second printed circuit card on rows of pins upstanding therefrom, said connecter comprising
   two opposing rows of generally U-shaped spring contacts each having two leg portions and a connecting bight portion,
   said first card having a plurality of terminal tabs on either side thereof at one edge,
   means for securing the corresponding portion of each of said contacts to one of the terminal tabs on either side of said first card, an insulating housing including two side walls and a plurality of separators extending inwardly therefrom to define an opening for receiving the edge of said first card and attached contacts, each of said contacts being inserted between adjacent ones of the separators, said housing having means for pre-loading and aligning said contacts when inserted therein, and means for exerting a frictional force for retaining said housing on said first card, the assembled housing and first card being adapted to be plugged on said pins on said second card whereby said spring contacts are engaged and deflected.

4. A printed circuit card connector for pluggably mounting a first printed circuit card approximately at right angles to a second printed circuit card on rows of pins upstanding therefrom, said connector comprising two opposing rows of generally U-shaped spring contacts each having two legs and a connecting bight portion, said first card having a plurality of terminal tabs on either side thereof at one edge, means for securing corresponding ones of the legs of said contacts to at least some of the terminal tabs on either side of said first card, an insulating housing including two side walls and a plurality of separators extending inwardly therefrom to define an opening for receiving the edge of said first card and attached contacts, each of said contacts being inserted between adjacent ones of the separators, said side walls having opposing ramps between said separators which are engaged by the other legs of said contacts during insertion for pre-loading and positioning said contacts, said ramps having notches which extend to the bottom of said housing and lie outwardly of the free ends of the other legs of said contacts when fully inserted in said housing, and means for exerting a frictional force for retaining said housing on said first card, said notches being adapted to receive the pins when the assembled first card and housing are plugged onto said second card.

5. A printed circuit card connector for pluggable mounting a first printed circuit card approximately at right angles to a second printed circuit card on rows of pins upstanding therefrom, said connector comprising two rows of generally U-shaped spring contacts each having two legs and a connecting bight portion, said first card being double-sided and having a plurality of spaced terminal tabs on either side thereof at one edge, means for securing the corresponding leg of each of said contacts to at least some of the terminal tabs on either side of said first card, a one-piece four-walled insulating housing generally open at the top and including a bottom rail and two side walls from which extend inwardly a plurality of separators to define an opening for receiving the edge of said first card and attached contacts, each of said contacts being inserted between adjacent ones of the separators, said side walls having opposing ramps between said separators which are engaged by the free ends of the other legs of said contacts during insertion for pre-loading and aligning said contacts, said ramps having notches which extend to the bottom of said housing and lie laterally of the free ends of the other legs of said contacts when fully inserted into said housing until said first card engages said bottom rail, and means for exerting a frictional force for retaining said housing on said first card, said notches being adapted to receive the pins when the assembled first card and housing are plugged onto said second card.

6. A printed circuit card connector for pluggably mounting a first printed circuit card approximately at right angles to a second printed circuit card, said second card having a plurality of pins upstanding from one surface thereof which are arranged in rows, a plurality of generally U-shaped spring contacts each having two legs and a connecting bight portion, said first card having a plurality of terminal tabs on either side thereof at one edge, means for securing the corresponding leg of each of said contacts to one of the terminal tabs on either side of said first card, an insulating housing including two side walls and a plurality of separators extending inwardly therefrom to define an opening for receiving the edge of said first card and attached contacts, each of said contacts being inserted between adjacent ones of the separators, said side walls having opposing ramps between said separators which are engaged by the free ends of the other contact legs during insertion for pre-loading and positioning said contacts, said ramps having notches which extend to the bottom of said housing and lie outwardly of the free ends of the other contact legs when fully inserted in said housing, and means for exerting a frictional force for retaining said housing on said first card, said pins being received in said notches and deflecting said other contact legs inwardly when the assembled housing and first card are plugged onto said second card.

7. A printed circuit card connector for pluggably mounting a first printed circuit card approximately at right angles to a second printed circuit card, said second card having a plurality of pins upstanding from one surface thereof which are arranged in substantially parallel rows, two opposing rows of generally U-shaped spring contacts each having two legs and a connecting bight portion, said first card having a plurality of terminal tabs on either side thereof at one edge, means for securing the corresponding leg of each of said contacts to one of the terminal tabs on either side of said first card, a one-piece insulating housing generally open at the top and including a bottom rail and two side walls from which extend inwardly a plurality of opposing separators to define an opening for receiving the edge of said first card and attached contacts, each of said contacts being inserted between adjacent ones of the separators, said side walls having opposing ramps between said separators which are engaged by the other contact legs during insertion for pre-loading and positioning said contacts, said ramps having notches which extend to the bottom of said housing and lie outwardly of the free ends of the other contact legs when fully inserted into said housing until said first card engages said bottom rail, and means for exerting a frictional force for retaining said housing on said first card, said pins being received in said notches and deflecting the free ends of said other contact legs inwardly when the assembled housing and first card are plugged onto said second card.

(References on following page)

References Cited by the Examiner

UNITED STATES PATENTS 3,138,417 6/1964 Garrett ---------- 339—150 X

OTHER REFERENCES

Buggie: HHB Catalog, January 8, 1954, page 3.

References Cited by the Applicant

UNITED STATES PATENTS

| | | |
|---|---|---|
| 2,119,680 | 6/1938 | Long. |
| 2,832,013 | 4/1958 | Pedersen et al. |
| 3,015,755 | 1/1962 | Wright et al. |
| 3,020,510 | 2/1962 | Kuch. |

JOSEPH D. SEERS, *Primary Examiner.*

ALFRED A. TRASK, *Examiner.*